(12) United States Patent
Liu

(10) Patent No.: US 7,748,133 B2
(45) Date of Patent: Jul. 6, 2010

(54) WORKPIECE INSPECTING DEVICE

(75) Inventor: Wei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 25 days.

(21) Appl. No.: 12/324,856

(22) Filed: Nov. 27, 2008

(65) Prior Publication Data
US 2009/0300932 A1 Dec. 10, 2009

(30) Foreign Application Priority Data
Jun. 4, 2008 (CN) .................... 2008 1 0301966.3

(51) Int. Cl.
*G01B 5/02* (2006.01)

(52) U.S. Cl. .................... 33/549; 33/501.05; 33/DIG. 1

(58) Field of Classification Search .................... 33/832, 33/501.05, 613, 626, 655, 545, 546, 549, 33/551, 552, DIG. 1
See application file for complete search history.

(56) References Cited

U.S. PATENT DOCUMENTS

| | | | | |
|---|---|---|---|---|
| 2,202,683 A * | 5/1940 | Demsky et al. | ............... | 33/549 |
| 2,270,158 A * | 1/1942 | Baesgen et al. | ............... | 33/549 |
| 2,569,660 A * | 10/1951 | Dow | ....................... | 33/501.05 |
| 2,636,278 A * | 4/1953 | Krause | .................... | 33/501.05 |
| 4,993,167 A * | 2/1991 | Durfee, Jr. | .................... | 33/626 |
| 5,086,569 A * | 2/1992 | Possati et al. | ................. | 33/549 |
| 5,182,866 A * | 2/1993 | Heymann | .................... | 33/645 |
| 5,353,516 A * | 10/1994 | Dalton | ........................ | 33/821 |
| 5,877,405 A * | 3/1999 | Champaigne | .............. | 73/11.02 |
| 6,698,103 B2 * | 3/2004 | Nortier et al. | ................. | 33/645 |
| 6,789,328 B2 * | 9/2004 | Beckhart et al. | .............. | 33/645 |
| 2003/0005594 A1 * | 1/2003 | Recupero | ..................... | 33/549 |

\* cited by examiner

*Primary Examiner*—Christopher W Fulton
(74) *Attorney, Agent, or Firm*—Frank R. Niranjan

(57) ABSTRACT

An exemplary workpiece inspecting device includes a base, a slider, a handle, a number of magnets, a number of probes and a measuring block. The slider is slidably mounted on the base and supports the handle thereon. The magnets are respectively embedded into the base for attracting and fixing a workpiece on the base. The probes are separately disposed on both the base and the slider for inspecting the perforations defined on a workpiece. The measuring block is attached on the slider for sliding and inspecting a thickness of the workpiece during the movement of the slider.

15 Claims, 3 Drawing Sheets

WORKPIECE INSPECTING DEVICE

BACKGROUND

1. Technical Field

The present invention relates to workpiece inspecting devices, and particularly, to a workpiece inspecting device used for inspecting a workpiece without deforming the workpiece.

2. Description of the Related Art

Inspection of a workpiece is an important processing step in the overall manufacturing process for guaranteeing the quality of the workpiece. However, due to the complex shape and the degree of high precision needed to inspect the workpiece, it is difficult to position and measure a workpiece in an inspecting device. Thus, multiple locating structures, such as catches or buckles, are employed to position and firmly hold the workpiece in place before inspection. Unfortunately, the catches and buckles may deform or damage the workpiece during the inspection process.

Therefore, it is desired to design a workpiece inspecting device used for inspecting a workpiece without deforming the workpiece.

DETAILED DESCRIPTION OF THE EXEMPLARY EMBODIMENT

Figure 1:
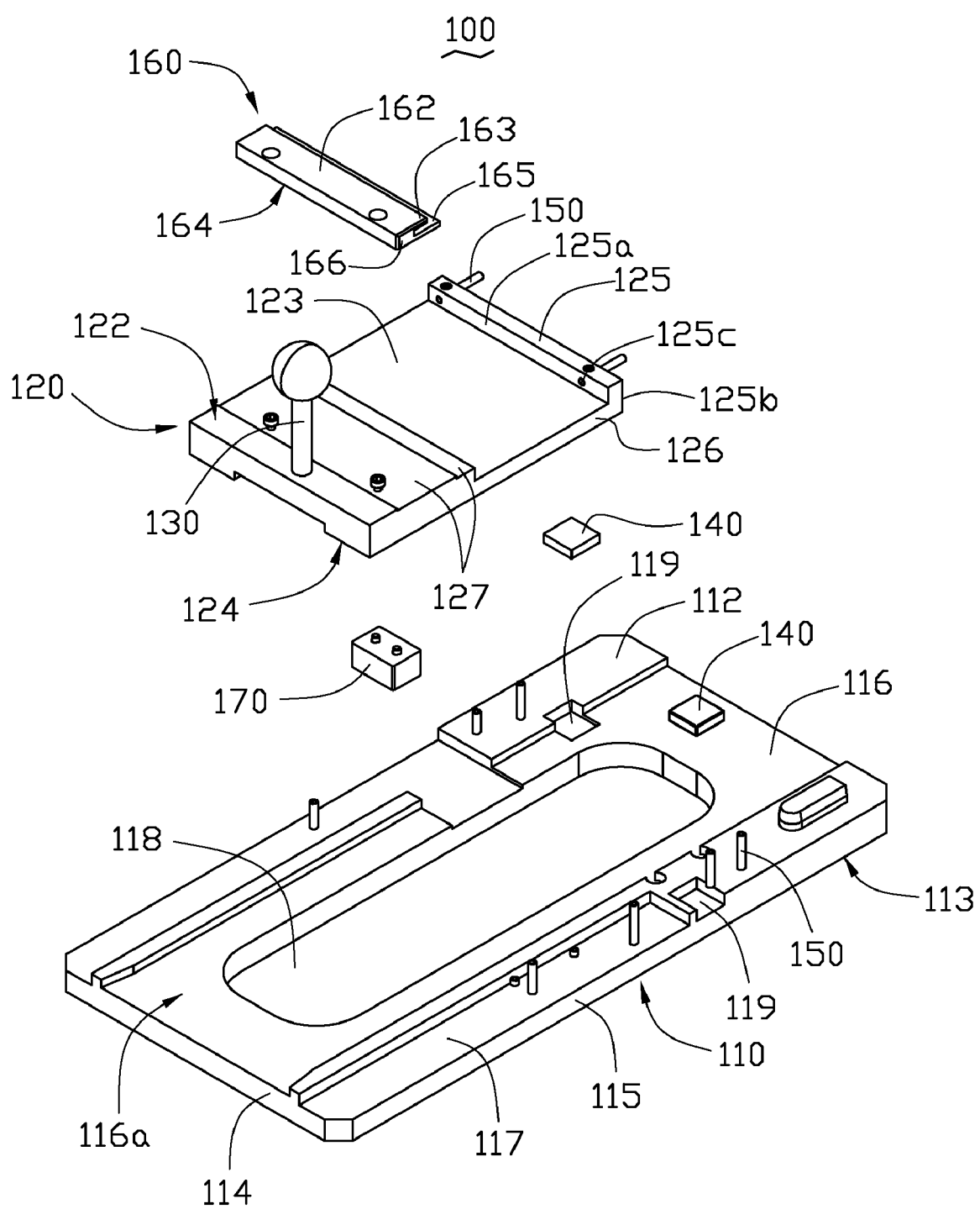
FIG. 1 is a schematic exploded view of a workpiece inspecting device according to an exemplary embodiment.
Figure 2:
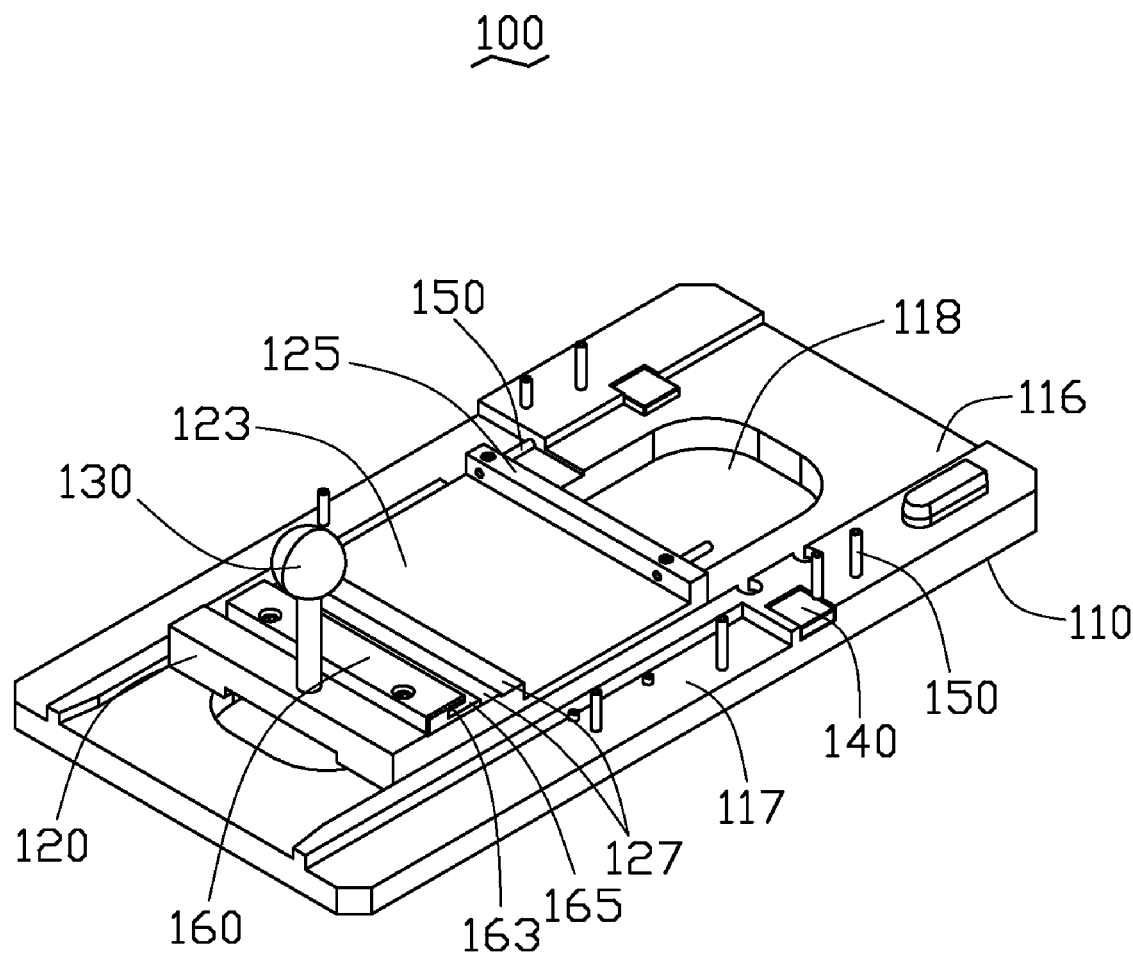
FIG. 2 is a schematic assembled view of the workpiece inspecting device as shown in FIG. 1.

Referring to FIGS. 1 and 2, a workpiece inspecting device 100 according to an exemplary embodiment includes a base 110, a slider 120, a handle 130, a number of magnets 140, a number of probes 150 and a measuring block 160. The slider 120 is slidably mounted on the base 110 and supports the handle 130 on a surface of the slider 120. The magnets 140 are respectively embedded into the base 110 for attracting and fixing a workpiece to be detected (hereafter called workpiece) on the base 110. The probes 150 are separately mounted on both the base 110 and the slider 120 for inspecting the workpiece. The measuring block 160 is attached on the slider 120 for inspecting the workpiece in a sliding manner in accordance with the movement of the slider 120.

The base 110 includes an upper surface 112, a lower surface 113 paralleled with the upper surface 112, two opposite side surfaces 114 and two opposite terminal surfaces 115 connecting with the upper surfaces 112 and the lower surface 113. A groove 116 having a bottom 116a is defined on the upper surface 112 of the base and runs through the two side surfaces 114. A hole 118 is defined on the bottom 116a of the groove 116 and runs through the lower surface 113 of the base 110. Two lower steps 117 separately formed on the upper surface 112 of the base 110 are adjacent to the groove 116 and are connected with the side surfaces 114 and terminal surfaces 115. Two cutouts 119 are defined on the upper surface 112 of the base 110 and are adjacent to the groove 116 and the lower steps 117. The magnets 140 are respectively positioned and fixed in the cutouts 119. Probes 150 are perpendicularly mounted on the upper surface 112 and the lower steps 117 of the base 110 for inspecting the workpiece.

The slider 120 is located in the groove 116 and can slide along the groove 116. The slider 120 includes a first surface 122, an opposite second surface 124, two separated third surfaces 126 connecting with the first and second surfaces 122, 124. The slider 120 defines a channel 123 running through two third surfaces 126 on the first surface 122. A bar 125 having an inner surface 125a and an outer surface 125b is formed on the slider 120 adjacent to the channel 123. Two through holes 125c, are separately defined on the bar 125 and run through the inner surface 125a and outer surface 125b, for receiving and fixing portion of probes 150 that are inserted therein. Adjacent to the channel 123, a number of upper steps 127 are formed on the first surface 122 of the slider 120 and opposite to the bar 125.

The handle 130 is mounted on the first surface 122 of the slider 120, away from the bar 125 by an end thereof, thereby allowing an operator to easily push or pull the slider 110.

The magnets 140 are respectively located in the cutouts 119 of the base 110. The height of each magnet 140 is substantially equal to or lower than the depth of the cutouts 119, therefore the uppermost surface of the magnet 140 is lower than the upper surface 112 of the base 110, the configuration which prevents portions of the magnets 140 from protruding beyond the cutouts 119.

The probes 150 are separately mounted on the base 110 and the slider 120. The probes 150 may be different from each other in diameter and length to suit the perforations defined in the workpiece. The probes 150 are used to inspect whether the workpiece has perforations in a predetermined position and are also used to measure whether the perforations' diameter meets predefined criteria. It is to be noted, where the probes 150 are to be mounted on is dependent on the positions of a standard workpiece where the perforations are defined.

The measuring block 160 is mounted on upper steps 127 via a bottom surface 164. The measuring block further includes a top surface 162 and a side wall 166 connected with the top and bottom surfaces 162, 164. Two separated plates 163 are parallel to each other and separately attached to the top and bottom surfaces 162 and 164, respectively, from the side wall 166. One plate 163 is longer than another plate 163. The distance between the two plates 163 is a predefined standard distance and is used to determine if the thickness of the workpiece meets a predefined criteria.

To prevent the slider 120 from separating from the groove 116 of the base during sliding, a stop block 170 is mounted to the second surface 124 of the slider 120 corresponding to the hole 118 of the base 110 to slidably hold the slider 120 in the grove 116. In addition, the positive corner between two connected surfaces of the upper steps 127 is designed as a smooth curve through which can avoid to scrape the workpiece.

Figure 3:
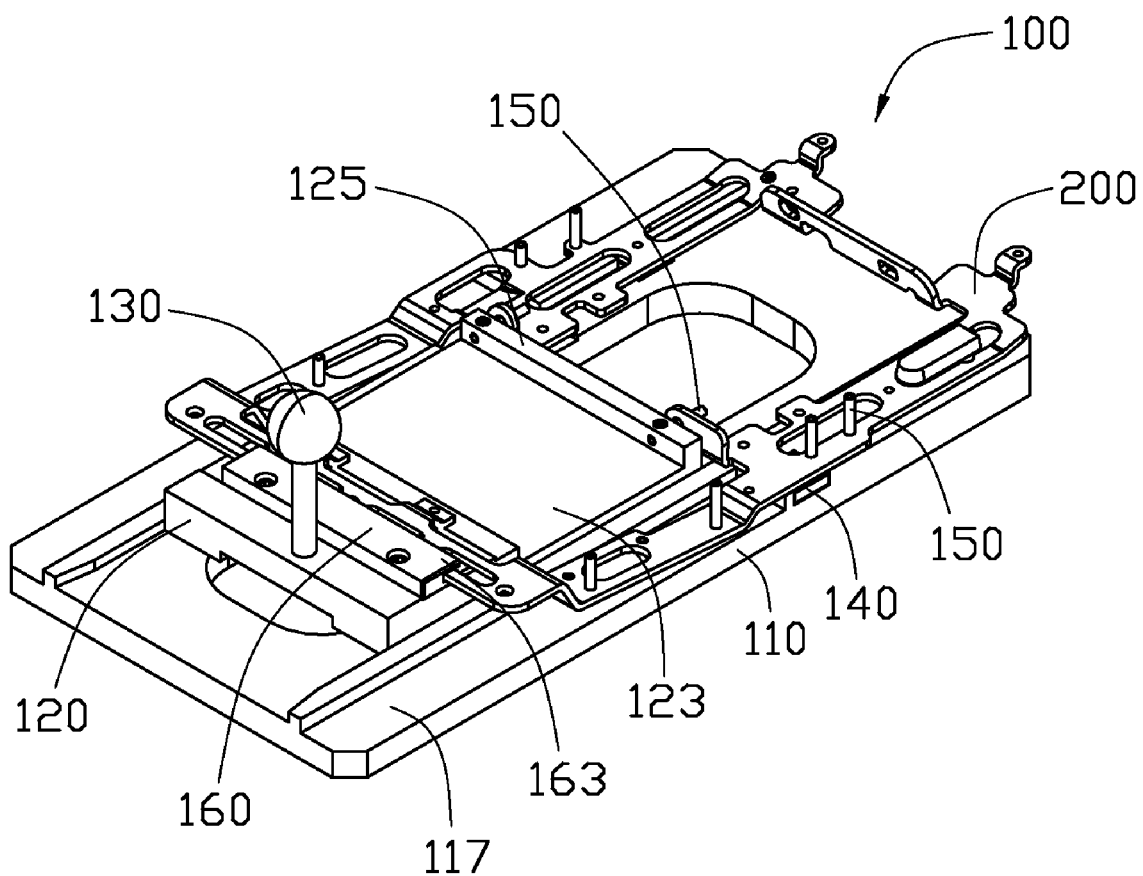
FIG. 3 is a schematic view of the workpiece inspecting device with a workpiece being inspected.

Referring to FIGS. 2 and 3, the usage of the workpiece inspecting device 100 is shown. A magnetic permeable workpiece 200 is located on the workpiece inspecting device 100. The magnets 140 received in the cutouts 119 firmly hold the magnetic permeable workpiece 200 to the upper surface 112 of the base 110, while the probes 150 mounted on the base 110 pass through the perforations on the magnetic permeable workpiece 200 to determine if the magnetic permeable workpiece 200 has those perforations formed thereon. Then, the slider 120 slides along the groove 116 of the base 110 towards the magnetic permeable workpiece 200 by pushing the handle 130, while the probes 150 fixed in the through holes 125c of the bar 125 passes through the perforations of the workpiece to determine if the workpiece 200 has the perforations formed in predefined positions of the workpiece. As the slider slides, an end portion of the magnetic permeable workpiece 200 is received into the space between the two plates 163, 165 of the measuring block 160 to determine if the thickness of the workpiece 200 meets a predefined criterion.

The exemplary workpiece inspecting device 100 employs magnets and probes collectively to fix, inspect and determine if the magnetic permeable workpiece has formed the perforations on predefined positions and the thickness of the workpiece meets a predefined criterion, without deformation of the workpiece. In addition, the slider, with a measuring block of the inspecting device 100, can inspect the workpiece quickly and conveniently and can be replaced easily according to different workpieces.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A workpiece inspecting device comprising:
a base;
a slider slidably mounted on the base;
a handle supported by the slider;
a plurality of magnets respectively embedded into the base for attracting and fixing a workpiece;
a plurality of probes separately mounted on the base and the slider for inspecting perforations defined on the workpiece; and
a measuring block attached on the slider for inspecting a thickness of the workpiece.

2. The workpiece inspecting device as claimed in claim 1, wherein the base includes an upper surface, a lower surface paralleled to the upper surface, two separated side surfaces and two separated terminal surfaces connecting with the upper surface and the lower surface respectively, a groove is defined on the upper surface of the base and runs through the two side surfaces, the slider is slidably mounted in the groove of the base.

3. The workpiece inspecting device as claimed in claim 2, wherein two lower steps separately formed on the upper surface of the base are adjacent to the groove and are connected with the side surfaces and terminal surfaces, a plurality of probes are mounted on the lower steps.

4. The workpiece inspecting device as claimed in claim 3, wherein two cutouts are defined on the upper surface of the base and are adjacent to the groove and the lower steps, the magnets are respectively received and fixed in the cutouts.

5. The workpiece inspecting device as claimed in claim 4, wherein the slider comprises a first surface, an opposite second surface, two separated third surfaces connected to the first and second surfaces, the first surface defines a channel running through the two third surfaces.

6. The workpiece inspecting device as claimed in claim 5, wherein a bar having an inner surface and an outer surface is formed on the slider adjacent to the channel, two through holes are separately defined on the bar and run through the inner surface and outer surface, a portion of probes are respectively and partly received in the through holes of the bar.

7. The workpiece inspecting device as claimed in claim 6, wherein a plurality of upper steps are formed on the first surface of the slider near the channel and are opposite to the bar.

8. The workpiece inspecting device as claimed in claim 7, wherein the measuring block having a top surface and a bottom surface parallel to the top surface is mounted on the steps of the slider via the bottom surface.

9. The workpiece inspecting device as claimed in claim 8, wherein the measuring block further includes a side wall connecting with the top and bottom surfaces, two separated plates are parallel to each other and separately attached to the top and bottom surfaces from the side wall of the block.

10. The workpiece inspecting device as claimed in claim 9, wherein one plate is longer than another plate.

11. The workpiece inspecting device as claimed in claim 2, wherein a hole is defined in the groove.

12. The workpiece inspecting device as claimed in claim 11, wherein a stop block is mounted on the second surface of the slider corresponding to the hole of the base to slidably hold the slider in the groove of the base.

13. The workpiece inspecting device as claimed in claim 4, wherein the height of each magnet is equal to or lower than the depth of the cutouts.

14. The workpiece inspecting device as claimed in claim 4, wherein the uppermost surface of the magnet is lower than the upper surface of the base.

15. The workpiece inspecting device as claimed in claim 7, wherein the positive corner between two connected surfaces of the upper steps is designed as a smooth curve.

* * * * *